(12) United States Patent
Kainuma et al.

(10) Patent No.: US 9,231,415 B2
(45) Date of Patent: Jan. 5, 2016

(54) STORED ELECTRIC POWER DISCHARGING CIRCUIT FOR INVERTER

(71) Applicant: TOSHIBA SCHNEIDER INVERTER CORPORATION, Mie-gun, Mie (JP)

(72) Inventors: Yoshihiro Kainuma, Mie (JP); Yoichi Goshi, Mie (JP)

(73) Assignee: Toshiba Schneider Inverter Corporation, Mie-Gun, Mie (JP)

( * ) Notice: Subject to any disclaimer, the term of this patent is extended or adjusted under 35 U.S.C. 154(b) by 135 days.

(21) Appl. No.: 14/065,971

(22) Filed: Oct. 29, 2013

(65) Prior Publication Data

US 2014/0125293 A1 May 8, 2014

(30) Foreign Application Priority Data

Oct. 31, 2012 (JP) ................................ 2012-240375

(51) Int. Cl.
| | | |
|---|---|---|
| H02J 7/00 | (2006.01) | |
| H02M 5/458 | (2006.01) | |
| H02M 7/217 | (2006.01) | |
| H02M 1/32 | (2007.01) | |

(52) U.S. Cl.
CPC ................ *H02J 7/00* (2013.01); *H02M 5/458* (2013.01); *H02M 7/217* (2013.01); *H02M 2001/322* (2013.01)

(58) Field of Classification Search
CPC ......... H02J 7/00; H02M 5/458; H02M 7/217; H02M 2001/322
See application file for complete search history.

(56) References Cited

U.S. PATENT DOCUMENTS

| | | | | |
|---|---|---|---|---|
| 3,609,458 A | * | 9/1971 | Penn ................................ | 361/45 |
| 4,686,619 A | * | 8/1987 | Edwards ......................... | 363/126 |
| 4,962,354 A | * | 10/1990 | Visser et al. .................... | 323/360 |
| 5,077,486 A | * | 12/1991 | Marson et al. .................. | 205/728 |
| 5,459,652 A | * | 10/1995 | Faulk ................................ | 363/49 |
| 5,465,202 A | * | 11/1995 | Ibori et al. ........................ | 363/37 |
| 5,729,426 A | * | 3/1998 | Ragsdale ......................... | 361/328 |
| 5,982,050 A | * | 11/1999 | Matsui ........................... | 307/10.7 |
| 7,843,167 B2 | * | 11/2010 | DeRome et al. ............... | 320/112 |
| 8,159,092 B2 | * | 4/2012 | Luthi et al. ...................... | 307/130 |
| 8,891,210 B2 | * | 11/2014 | Itou ................................. | 361/23 |
| 8,970,063 B2 | * | 3/2015 | Leppanen ........................ | 307/32 |
| 2011/0298282 A1 | * | 12/2011 | Leppanen ........................ | 307/32 |
| 2012/0319602 A1 | * | 12/2012 | Naruo et al. .................... | 315/192 |
| 2013/0128639 A1 | * | 5/2013 | Ettes et al. ...................... | 363/126 |

FOREIGN PATENT DOCUMENTS

| | | |
|---|---|---|
| JP | 05-030755 | 2/1993 |
| JP | 05-252755 | 9/1993 |
| JP | 10-295081 | 11/1998 |

OTHER PUBLICATIONS

English Language Abstract and Translation of JP 10-295081 published Nov. 4, 1998.
English Language Abstract and Translation of JP 05-030755 published Feb. 2, 1993.
English Language Abstract and Translation of JP 05-252755 published Sep. 28, 1993.

* cited by examiner

*Primary Examiner* — Naum B Levin
(74) *Attorney, Agent, or Firm* — DLA Piper LLP (US)

(57) ABSTRACT

A stored electric power discharging circuit for an inverter device includes a group of series resistors configured to be connected in parallel to a plurality of main circuit capacitors in a normal operation, a voltage stabilization circuit configured to stabilize interterminal voltages of the respective main circuit capacitor according to a divided voltage of the series resistors during the normal operation, and a control switch having a control input and configured to cut the direct connection between the series resistors at a time of power-off, thereby breaking a voltage stability state of the main circuit capacitors by the voltage stabilization circuit.

4 Claims, 6 Drawing Sheets

US 9,231,415 B2

STORED ELECTRIC POWER DISCHARGING CIRCUIT FOR INVERTER

CROSS-REFERENCE TO RELATED APPLICATIONS

This application is based upon and claims the benefit of priority from the prior Japanese Patent Application No. 2012-240375 filed on Oct. 31, 2012, the entire contents of both of which are incorporated herein by reference.

FIELD

Embodiments described herein relate to a stored electric power discharging circuit for an inverter.

BACKGROUND

An inverter device rectifies and smooths AC power to generate DC voltage. The DC voltage is supplied to an inverter main circuit, which is then driven. Capacitors having large capacities, such as aluminum electrolytic capacitors, are used as main circuit capacitors for smoothing the DC voltage. The DC power is stored in the main circuit capacitors even when the inverter device has been powered off. Accordingly, there is a possibility of electrical shock when the inverter device is touched.

To discharge electric power stored in the main circuit capacitors, the conventional art uses discharge resistors connected in parallel to the main circuit capacitors to reduce a discharge time during power-off. However, this results in discharge even during power supply, so a large resistance value is required so that an amount of discharge is rendered small during a normal operation after power supply. Thus, the above-described arrangement cannot reduce the discharge time during power-off cannot be reduced. Furthermore, rendering the resistance value smaller increases unnecessary loss in normal operation despite reducing the discharge time.

For example, when a plurality of capacitors is series-connected for use as main circuit capacitors, balancing resistors are sometimes connected in parallel to the main circuit capacitors to balance voltages applied to the main circuit capacitors respectively. In this case, even though combination use of the balancing resistors as discharge resistors can be considered, the discharge resistors are normally connected to the main circuit capacitors as described above, causing unnecessary loss in normal operation.

DETAILED DESCRIPTION

In general, according to one embodiment, a stored electric power discharging circuit for an inverter device includes a group of series resistors configured to be connected in parallel to a plurality of main circuit capacitors in a normal operation. A voltage stabilization circuit is configured to stabilize interterminal voltages of the respective main circuit capacitors according to a divided voltage of the group of series resistors during the normal operation. A control switch has a control input and configured to cut a direct connection between two of the group of series resistors at a time of power-off, thereby breaking a voltage stability state of the main circuit capacitors by the voltage stabilization circuit.

According to another embodiment, a stored electric power discharging circuit for an inverter device includes a first series resistor group including a plurality of series resistors configured to be connected in parallel to a plurality of main circuit capacitors. A second series resistor group includes a plurality of series resistors configured to be connected in parallel to a plurality of main circuit capacitors. A voltage stabilization circuit is configured to stabilize interterminal voltages of the respective main circuit capacitors according to a divided voltage of the first series resistors and a divided voltage of the second series resistors during the normal operation. A control switch has a control input and is configured to switch a voltage dividing ratio of the first series resistor group to another first voltage dividing ratio and simultaneously to switch a voltage dividing ratio of the second series resistor group to a second voltage dividing ratio differing from the first dividing ratio, thereby breaking a voltage stability state of the main circuit capacitors by the voltage stabilization circuit.

Embodiments will be described with reference to the accompanying drawings. Identical or similar parts will be labeled by the same or similar reference symbols throughout the embodiments.

Figure 1:
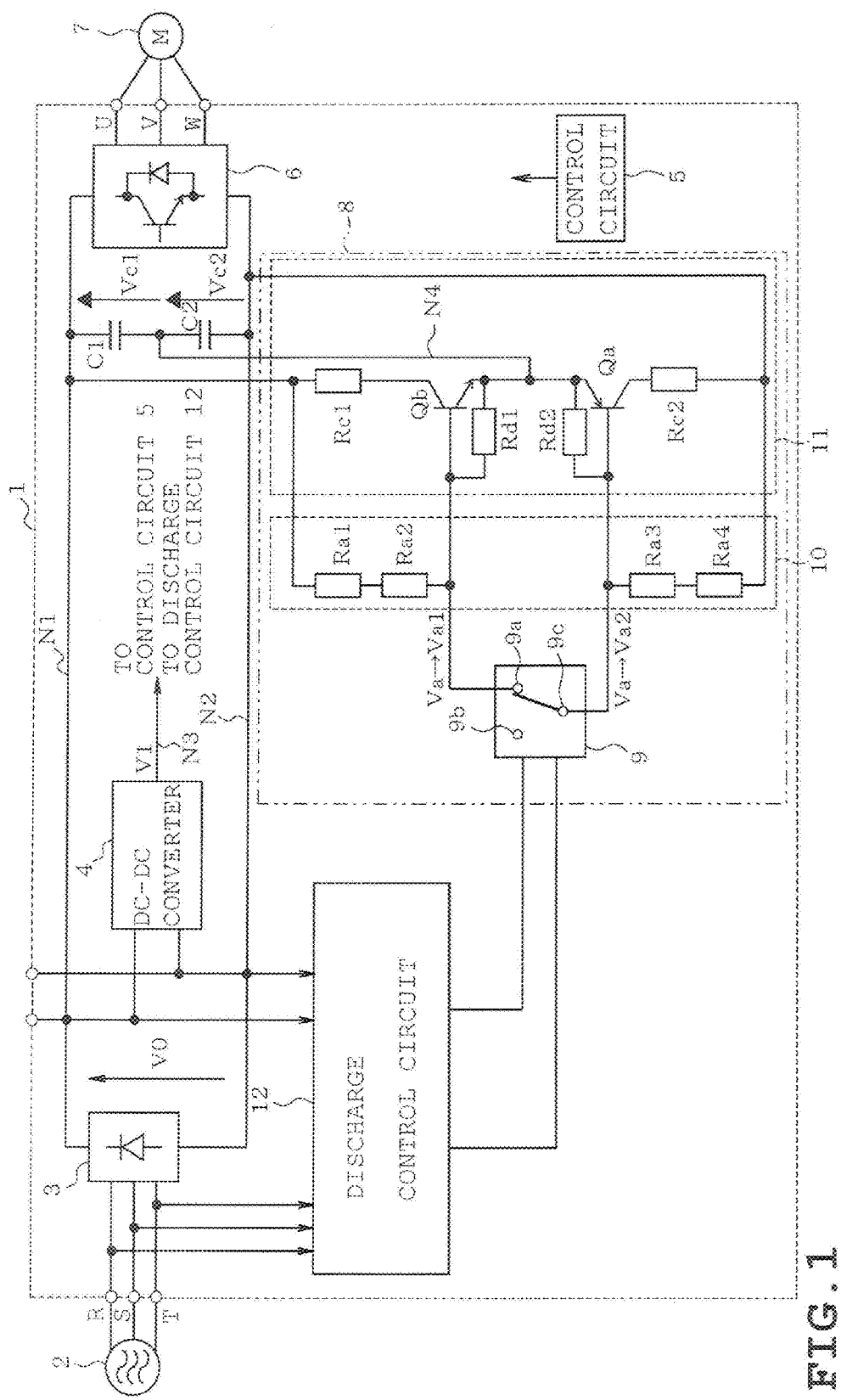
FIG. 1 is a schematic diagram showing an electrical arrangement of an inverter device according to a first embodiment.

A first embodiment will be described with reference to FIGS. 1 and 2. Referring to FIG. 1, an inverter device 1 incorporating a stored electric power discharging circuit is shown. The inverter device 1 includes terminals R, S and T to be connected to a three-phase AC power supply 2. A rectifier 3 is connected to the terminals R, S and T. An AC power is supplied from the AC power supply 2 via the terminals R, S and T to the rectifier 3, which rectifies the supplied AC power. Output of the rectifier 3 is supplied to main power supply lines N1 and N2. Main circuit capacitors C1 and C2 are series-connected between the main power supply lines N1 and N2. The main circuit capacitors C1 and C2 smooth the rectified output of the rectifier 3, thereby supplying DC power (DC voltage). The main circuit capacitors C1 and C2 are each set to about several thousands μF (6800 μF, for example). The plural main circuit capacitors C1 and C2 are provided for the purpose of ensuring sufficient breakdown voltage even in the case of a high voltage rectified by the rectifier 3.

The aforementioned DC power is supplied to a DC-DC converter 4. The DC-DC converter 4 carries out voltage conversion of the supplied DC power. Converted DC power is supplied as a control DC power supply V1 via an output node N3 to a control circuit 5. The DC power smoothed by the main circuit capacitors C1 and C2 is also supplied to an inverter main circuit 6. The inverter main circuit 6 converts the supplied DC power to a corresponding AC power based on PWM control signals generated and delivered by the control circuit 5, supplying three-phase AC power to an electric motor 7.

A balancing circuit 8 is connected between a terminal of the main circuit capacitor C1 and a terminal of the main circuit capacitor C2 in order that voltage balance may be kept between the main circuit capacitors C1 and C2 during a normal operation. The balancing circuit 8 is configured to correct voltage variations of the main circuit capacitors C1 and C2.

The balancing circuit 8 includes in combination a discharge control switch (serving as a control switch) 9, a series resistor group 10 and a voltage stabilization circuit 11. The series resistor group 10 includes resistors Ra1, Ra2, Ra3 and Ra4 series-connected via a fixed contact 9a and a movable contact 9c of the discharge control switch 9 between the main power supply lines N1 and N2. In the embodiment, the resistors Ra1-Ra4 are set to the same resistance value. The discharge control switch 9 is connected between the resistors Ra2 and Ra3. The resistors Ra1 to Ra4 are each set to a resistance value of about several hundreds kΩ (360 kΩ, for example).

The discharge control switch 9 includes a fixed contact 9b as well as the aforementioned fixed and movable contacts 9a and 9b. The discharge control switch 9 is composed into a normally open type relay switch, for example. The fixed and movable contacts 9a and 9c are connected to each other in the normal operation, so that electric current flows through the contacts 9a and 9c. When supplied with a discharge command signal from a discharge control circuit 12, the discharge control switch 9 switches from the fixed contact 9a side to the fixed contact 9b side. Accordingly, the resistors Ra1-Ra4 of the series resistor group 10 are series connected in the normal operation. Thereafter, when the discharge control switch 9 is supplied with a discharge command signal from the discharge control circuit 12, the resistors Ra1 and Ra2 are disconnected from the resistors Ra3 and Ra4. The discharge control switch 9 may comprise a semiconductor switch.

The voltage stabilization circuit 11 is connected to a latter part of the series resistor group 10. The voltage stabilization circuit 11 is composed of a resistor Rc1 serving as a first conductive resistor, a collector-emitter path of an NPN transistor (a first transistor) Qb, an emitter-collector path of a PNP transistor (a second transistor) Qa and a resistor Rc2 serving as a second conductive resistor, all of which are series-connected to one another between the main power supply lines N1 and N2. Furthermore, a resistor Rd1 is connected between the base and the emitter of the transistor Qb and a resistor Rd2 is connected between the base and the emitter of the transistor Qa.

Furthermore, the emitters of the transistors Qa and Qb are commonly connected at a common connection point, which is further connected to a common connection point of the main circuit capacitors C1 and C2. For example, the resistors Rc1 and Rc2 are set to the same resistance value of about several tens kΩ (28 kΩ, for example) and the resistors Rd1 and Rd2 are also set to the same resistance value of about one hundred and several tens kΩ (180 kΩ, for example). In the embodiment, the series resistor group 10 serves as a group of series resistors. A combination of the resistors Ra1 and Ra2 serves as a first set of resistors, and a combination of the resistors Ra3 and Ra4 serves as a second set of resistors. The resistor Rc1 serves as a first conductive resistor and the resistor Rc2 serves as a second conductive register.

The discharge control circuit 12 is connected to the terminals R, S and T and output of the DC-DC converter 4. To the discharge control circuit 12 are supplied power supply input signals of the terminals R, S and T, output voltage of the rectifier 3 (a terminal voltage V0 between the main power supply lines N1 and N2) and/or output voltage V1 of the DC-DC converter 4. The discharge control circuit 12 supplies a discharge command signal to the discharge control switch 9.

The discharge control circuit 12 includes a rectifier which rectifies AC power supplied from the three-phase AC power supply 2, various resistors, various transistors (a PNP transistor, an NPN transistor and a field effect transistor (FET), for example), and the like, for example. When output of the three-phase AC power supply 2 is cut off, for example, the discharge control circuit 12 detects power input having dropped below a predetermined first threshold voltage, the output voltage V0 between the main power supply lines N1 and N2 having dropped below a predetermined second threshold voltage or an output voltage V1 of the DC-DC converter 4 having dropped below a predetermined third threshold value, so that the discharge control circuit 12 generates a discharge command signal and delivers the command signal to the discharge control switch 9.

The inverter device 1 configured as described above will work as follows. A large-capacity electrolytic capacitor is used as each of the main circuit capacitors C1 and C2 in many cases. Furthermore, the voltage Vc2 of a common connection node N4 of the main circuit capacitors C1 and C2 differs from an ideal voltage (V0/2) according to a difference between leak current fluctuations of the capacitors C1 and C2 in many cases. In view of these drawbacks, the balancing circuit 8 is provided in the embodiment.

The movable contact 9c is connected to the fixed contact 9a in the discharge control switch 9 in a normal operation after power-on as described above. The series resistors 10 (Ra1 and Ra2; and Ra3 and Ra4) are all series-connected. DC voltage to be supplied between the main power supply lines N1 and N2 is then applied to the series resistors 10, so that a bias voltage Va is applied to bases (control terminals) of the transistors Qb and Qa. When a resistance ratio of resistance (Ra1+Ra2) to resistance (Ra3+Ra4) is set to 1:1, the bias voltage Va becomes a half of the DC voltage V0 between the main power supply lines N1 and N2.

In the case where the main circuit capacitors C1 and C2 have the same capacity, voltage Vc2 of the node N4 ideally becomes a half of the voltage V0 between the main power supply lines N1 and N2. Since a base-emitter voltage of each of the transistors Qb and Qa then becomes 0, both transistors Qa and Qb are turned off, whereupon no current flows in the transistors Qa and Qb.

However, when leak current of the main circuit capacitor C1 is larger than leak current of the main circuit capacitor C2 according to differences between the elements of the main circuit capacitors C1 and C2, an interterminal voltage Vc1 of the main circuit capacitor C1 becomes smaller than an interterminal voltage Vc2 of the main circuit capacitor C2, with the result that the voltage Vc2 at the node N4 rises from the ideal voltage (=V0/2). In this case, according to the circuit configuration as shown in FIG. 1, the transistor Qa is turned on while the transistor Qb remains in an off-state. Consequently, the voltage Vc2 drops to approximate to the ideal voltage (=V0/2).

On the contrary, when the leak current of the main circuit capacitor C1 is smaller than the leak current of the main circuit capacitor C2, the interterminal voltage Vc1 of the main circuit capacitor C1 becomes larger than the interterminal voltage Vc2 of the main circuit capacitor C2, whereupon the voltage Vc2 at the node N4 drops below the ideal voltage (=V0/2). In this case, current flows in the resistor Rc1 when the transistor Qb is turned on while the transistor Qa remains in the off-state. Consequently, the voltage Vc2 rises to approximate to the ideal standard voltage (=V0/2).

Accordingly, the voltage at the node N4 can be approximated to the ideal voltage (=V0/2) in no matter what manner the leak currents of the main circuit capacitors C1 and C2 fluctuate. When the three-phase AC power supply 2 is cut off, the discharge control circuit 10 supplies a discharge command signal to the discharge control switch 9. The discharge control switch 9 then switches the movable contact 9c from the fixed contact 9a side to the fixed contact 9b side. The base voltage of the transistor Qb is then approximated rapidly to the voltage of the main power supply line N1. In this case, the base voltage of the transistor Qb rises from voltage Va to voltage Va1 (>Va). Furthermore, the base voltage of the transistor Qa is simultaneously approximated rapidly to the voltage of the main power supply line N2. In this case, the base voltage of the transistor Qa drops from voltage Va to voltage Va2 (<Va). Voltage of not less than the threshold voltage of the transistor is applied between the bases and the emitters of the respective transistors Qb and Qa substantially simultaneously, whereby the transistors Qb and Qa are turned on substantially simultaneously.

Electric charge stored in the main circuit capacitor C1 is discharged mainly through the resistor Rc1 and a collector-emitter path of the transistor Qb, while electrical charge stored in the main circuit capacitor C2 is discharged mainly through the transistor Qa and the resistor Rc2. Consequently, even if the three-phase AC power supply 2 is cut off, for example, the electrical charge stored in the main circuit capacitors C1 and C2 can safely be discharged.

Figure 2:
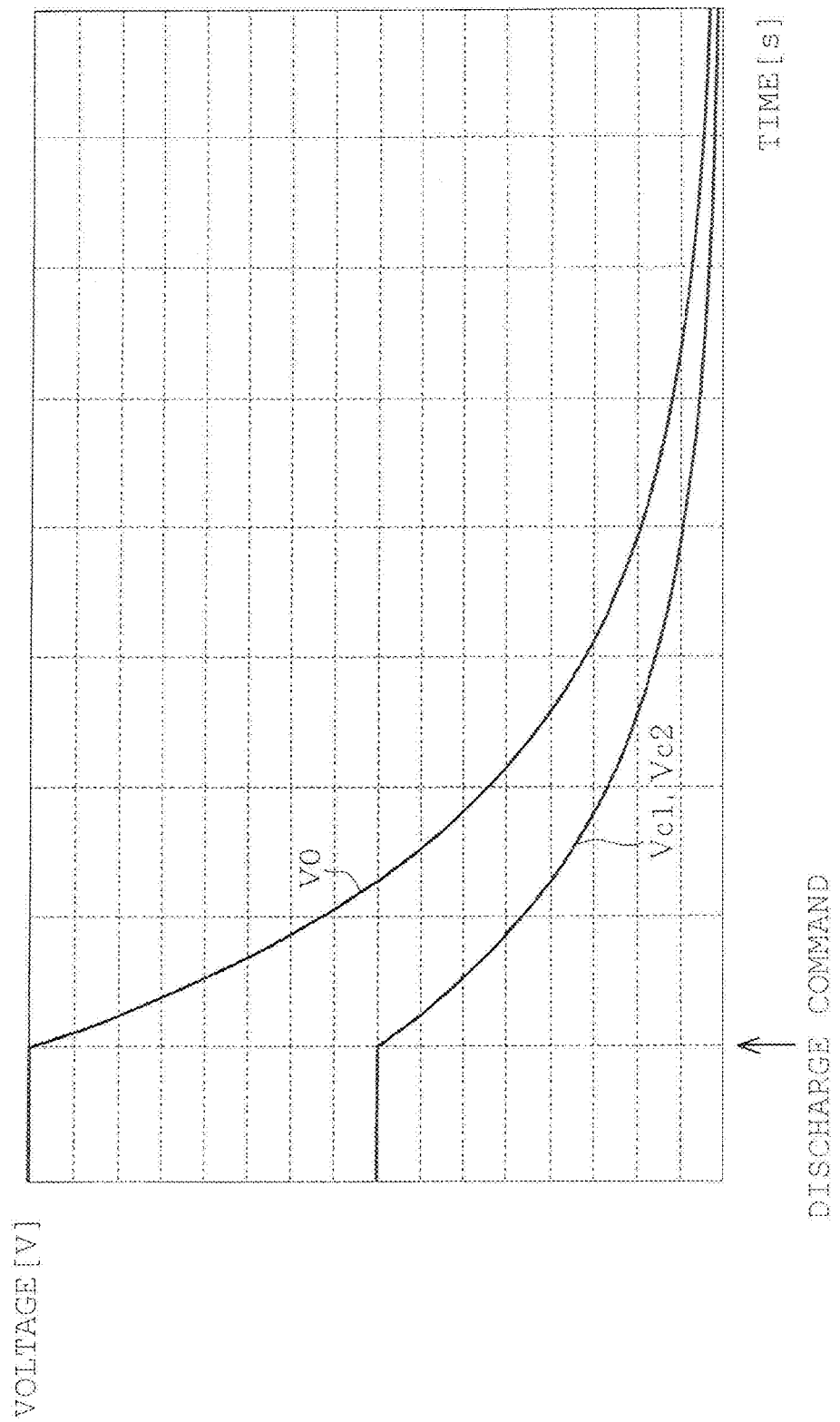
FIG. 2 is a timing chart showing node voltage changes with time before and after power-off in the first embodiment.
Figure 4:
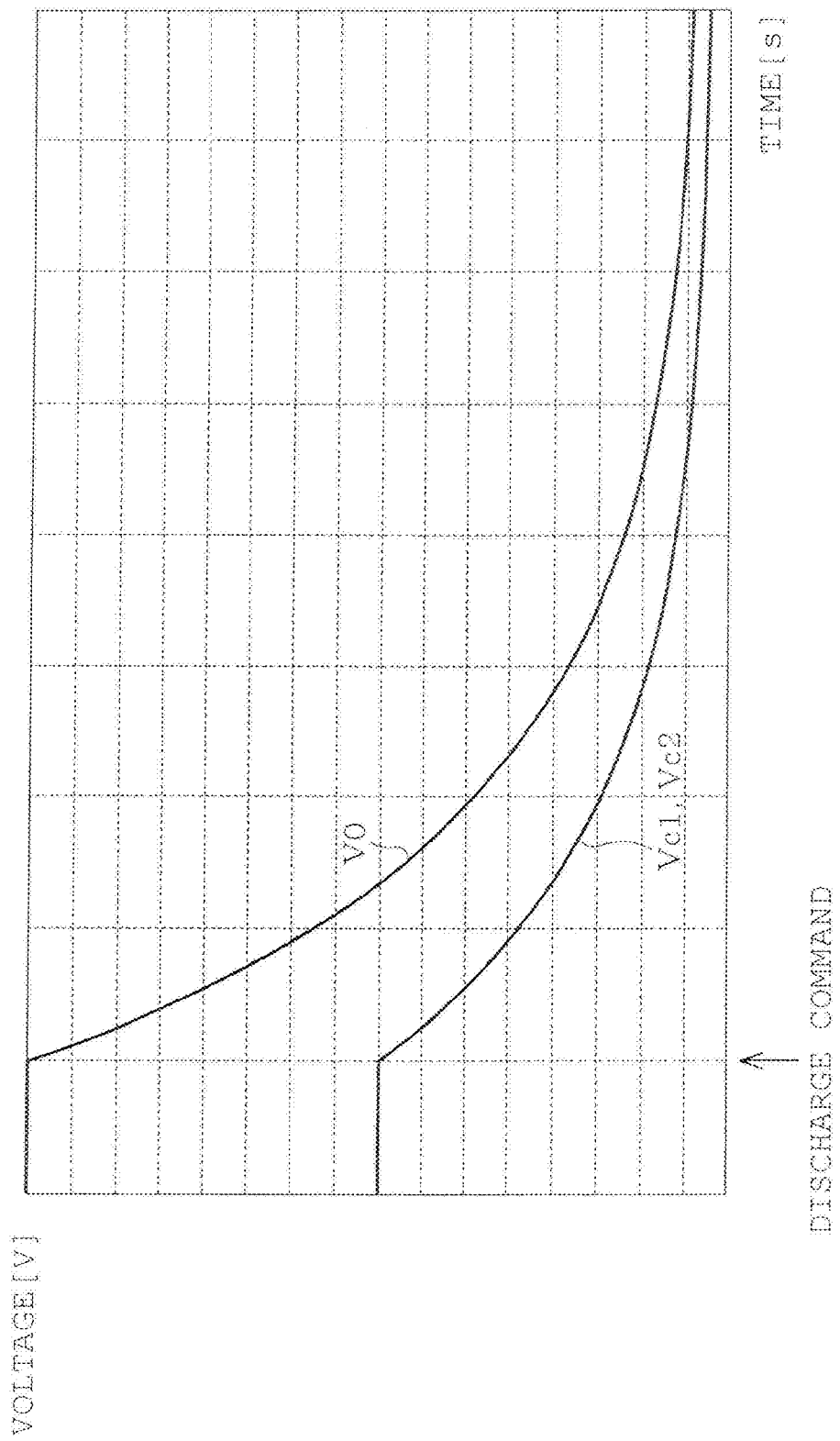
FIG. 4 is a timing chart similar to FIG. 2, showing the second embodiment.
Figure 6:
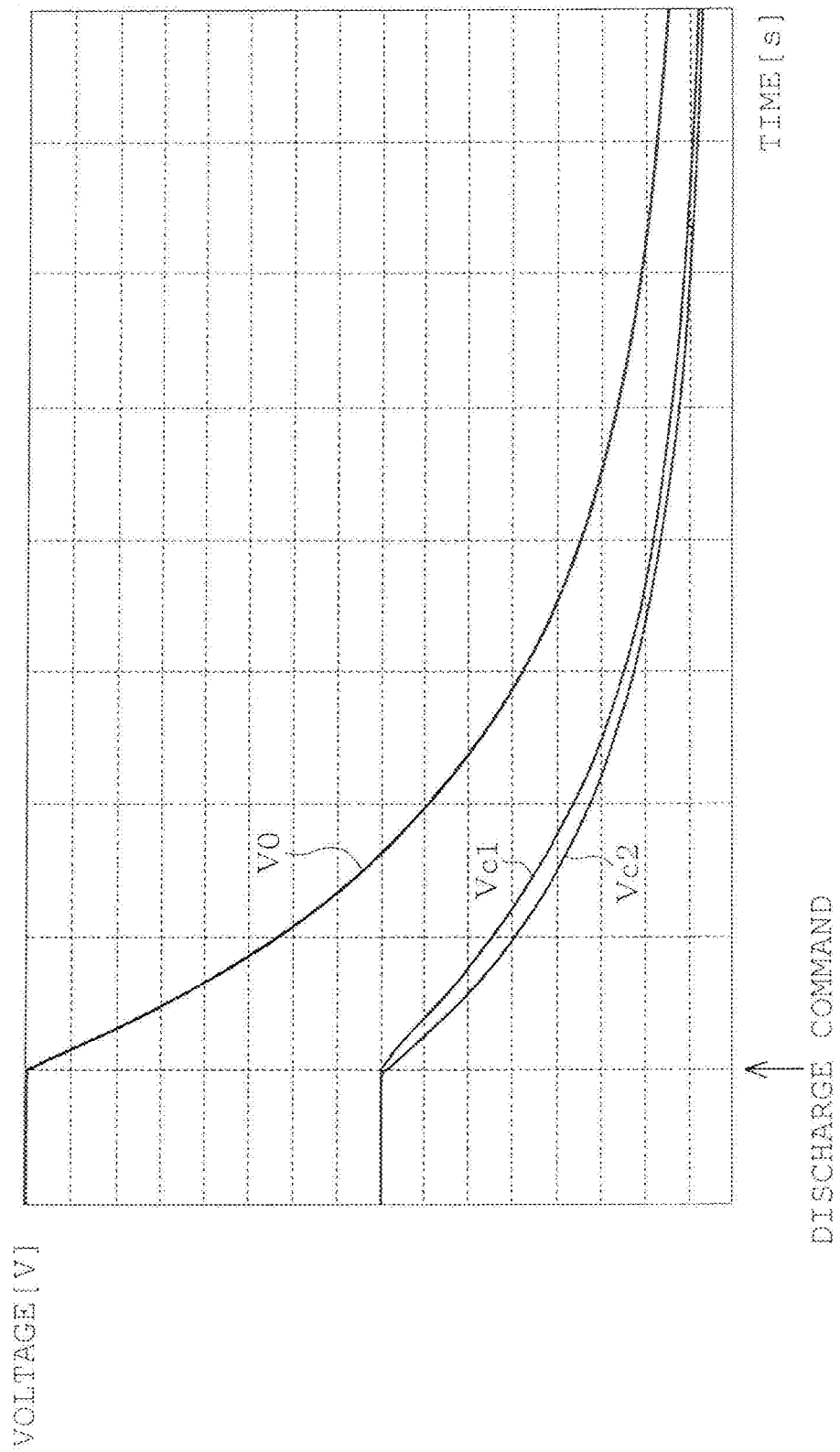
FIG. 6 is a timing chart similar to FIGS. 2 and 4, showing the characteristics compared to the characteristics of the first and second embodiments.

FIG. 2 shows discharge characteristics of the voltage V0 between the main power supply lines N1 and N2 and the interterminal voltages Vc1 and Vc2 of the capacitors C1 and C2 before and after output of a discharge command. FIGS. 4 and 6 show discharge characteristics in other embodiments respectively and have the same time scale of a horizontal axis and voltage scale of a vertical axis as those of FIG. 2. It can be understood that electrical discharge can occur more quickly in the characteristics of FIG. 2 than in those of FIGS. 4 and 6.

According to the above-described embodiment, the transistors Qa and Qb are turned on and off in a normal operation, so that the voltage Vc2 at the common connection node N4 of the main circuit capacitors C1 and C2 is maintained approximately at V0/2. In power-off, the voltage of the series resistor 10 is divided into a plurality of parts by the discharge control switch 9, whereby voltage-stabilized states of the main circuit capacitors C1 and C2 are broken. More specifically, the base voltage of the transistor Qb is switched so as to rise from voltage Va to voltage Va1 and simultaneously, the base voltage of the transistor Qa is switched so as to drop from voltage Va to voltage Va2. Both transistors Qa and Qb are then turned on simultaneously and rapidly with the result that the charges stored in the respective main circuit capacitors C1 and C2 can be discharged quickly. Consequently, the charges stored in the main circuit capacitors C1 and C2 can be discharged quickly upon occurrence of power-off.

FIGS. 3 to 6 illustrate a second embodiment. The second embodiment differs from the first embodiment in a change in the configuration of the balancing circuit. Identical or similar parts in the second embodiment are labeled by the same or similar reference symbols as those in the first embodiment. The description of these parts will be eliminated and only the difference between the first and second embodiments will be described.

Figure 3:
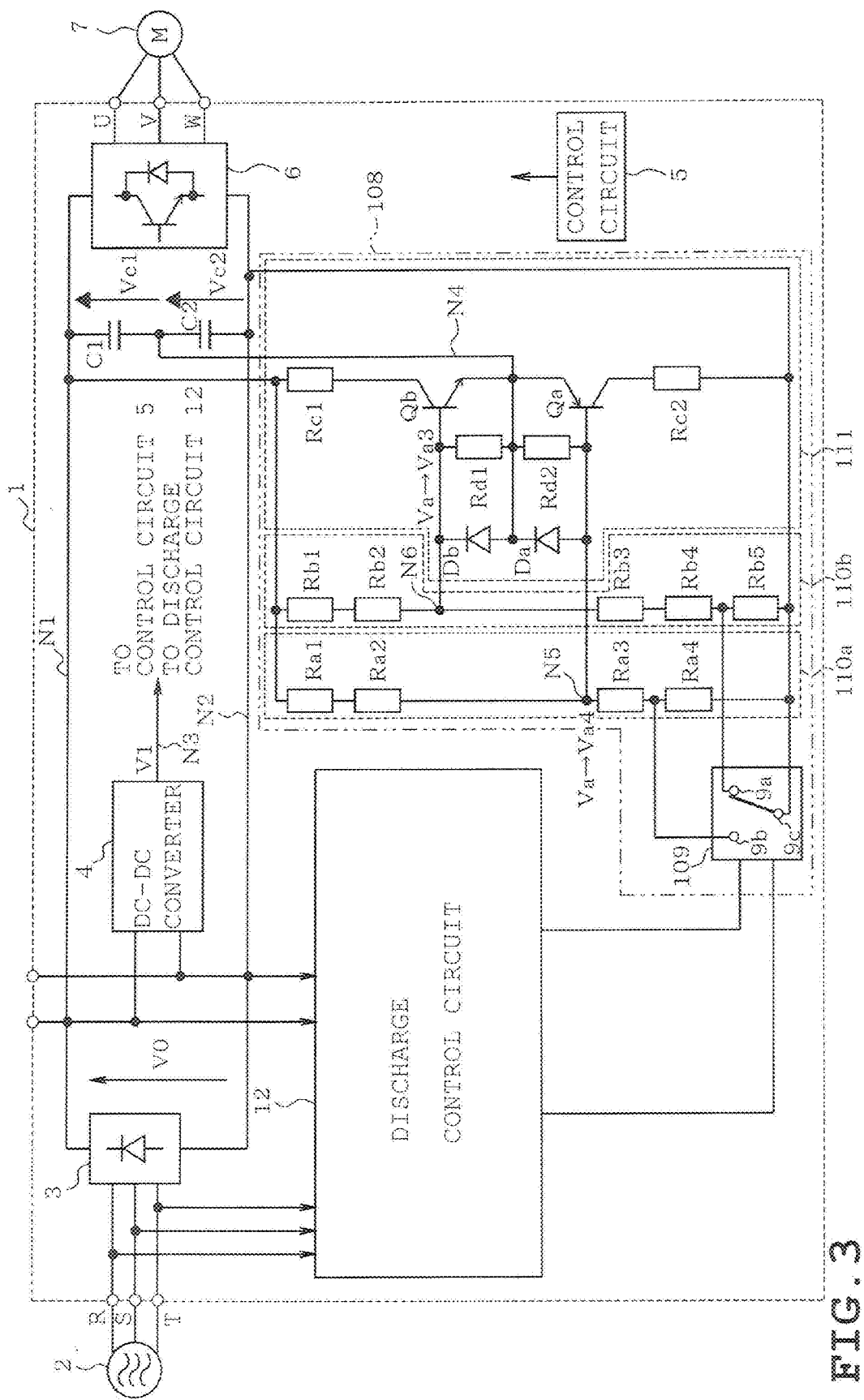
FIG. 3 is a diagram similar to FIG. 1, showing an inverter device according to a second embodiment.

The balancing circuit 108 includes a resistor circuit further including a series resistor (serving as the first series resistor) 110a and a series resistor (serving as the second series resistor) 110b between the main power supply lines N1 and N2, as shown in FIG. 3. The two series resistors 110a and 110b are connected in parallel to each other. The series circuit 110a is composed of four resistors Ra1 to Ra4 connected in series to one another. The series resistor 110b is composed of five resistors Rb1 to Rb5 connected in series to one another. The resistors Ra1 to Ra4 and the resistors Rb1 to Rb4 are set to the same resistance value. The resistor Rb5 is not necessarily set to the same value as that of the resistors Ra1 to Ra4 and Rb1 to Rb4.

The series resistors Ra1 to Ra4 and Rb1 to Rb4 are all set to a resistance value of several hundred kΩ (360 kΩ, for example). The series resistor Rb5 is set to a resistance value of a hundred and several tens kΩ (180 kΩ, for example). A resistance ratio of additional resistance value of resistors Ra1 and Ra2 to additional resistance value of resistors Ra3 and Ra4 is set to 1:1. A resistance ratio of additional resistance value of resistors Ra1, Ra2 and Ra3 to resistance value of resistor Ra4 is set to 3:1.

In the embodiment, the series resistor 110a serves as a first series resistor, and the series resistor 110b serves as a second series resistor. The combined resistors Ra1 and Ra2 (Ra1+Ra2) serve as a third resistor. The combined resistors Ra3 and Ra4 (Ra3+Ra4) serve as a fourth resistor. The combined resistors Rb1 and Rb2 (Rb1+Rb2) serve as a fifth resistor. The combined resistors Rb3 and Rb4 (Rb3+Rb4) serve as a sixth resistor. The resistor Rb5 serves as a seventh resistor.

A common connection point N5 of the series resistor of the resistors Ra1 and Ra2 and the series resistor of the resistors Ra3 and Ra4 is connected to the base of the transistor Qa. Furthermore, a common connection point N6 of the series resistor of the resistors Rb1 and Rb2 and the series resistor of the resistors Rb3 and Rb4 is connected to the base of the transistor Qb.

The balancing circuit 108 also includes a voltage stabilization circuit 111 provided at a stage subsequent to the two series resistors 110a and 110b. The voltage stabilization circuit 111 is mainly composed in the same manner as the voltage stabilization circuit 11 in the foregoing embodiment and further includes protection diodes Da and Db. The protection diode Da is antiparallel-connected between the emitter and the base of the transistor Qa, and the protection diode Db is antiparallel-connected between the emitter and the base of the transistor Qb.

When interterminal voltages of the main circuit capacitors C1 and C2 are unbalanced or when either capacitor C1 or C2 is shorted with the result that the interterminal voltage of the shorted capacitor is unbalanced, the protection diodes Da and Db function to prevent an abnormal condition from expanding to other parts of the inverter device 1. For example, when the main circuit capacitor C1 is shorted, reverse bias occurs between the base and the emitter of the transistor Qb since voltage Vc2 becomes equal to voltage V0. The protection diode Db is provided between the base and the emitter of the transistor Qb since there is a possibility that the transistor Qb may be adversely affected by the reverse bias thereby to come into an abnormal condition. The protection diode Da is also provided between the base and the emitter of the transistor Qa for the same purpose as of the protection diode Db. In the configuration of the first embodiment as shown in FIG. 1, there is no occurrence of reverse bias between the bases and the emitters of the respective transistors Qa and Qb even when the voltage sharing between the main circuit capacitors C1 and C2 is lost. Accordingly, the circuit configuration shown in FIG. 1 need not be provided with the protection diodes Da and Db.

The discharge control switch 109 is comprised of a change-over contact type relay switch, for example and has a movable contact 9c connected to a common connection point (the main power supply line N2) of the resistors Ra4 and Rb5 and a fixed contact 9a connected to the other terminal of the resistor Rb5. The other fixed contact 9b of the discharge control switch 109 is connected to the other terminal of the resistor Ra4. The movable contact 9c of the discharge control switch 109 is connected to the fixed contact 9a side in the normal operation. The base voltages of the transistors Qa and Qb then become equal to each other at voltage Va (=V0/2).

When the interterminal voltage Vc1 of the main circuit capacitor C1 rises according to variations in leak current, the transistor Qb is turned on since the voltage Vc2 at the node N4 drops, in the same manner as described above. Consequently, electric current flows across the resistor Rc1 with the result that the voltage Vc2 at the node N4 rises. On the contrary, when the interterminal voltage Vc1 of the main circuit capacitor C1 drops, the transistor Qa is turned on since the voltage Vc2 at the node N4 rises. Consequently, electric current flows across the resistor Rc2 with the result that the voltage Vc2 at the node N4 drops. Thus, the voltage balance can be maintained.

When the discharge control circuit 12 supplies a discharge command signal to the discharge control switch 109, the discharge control switch 109 switches so that the movable contact 9c is connected to the fixed contact 9b side. Thus, when the discharge control switch 109 is switched to the fixed contact 9b side during power-off, the voltage at the node N6 rises and simultaneously, the voltage at the node N5 drops. More specifically, the voltage Va3 (>V0/2) is supplied to the base of the transistor Qb and simultaneously, the voltage Va4 (<V0/2) is supplied to the base of the transistor Qa. Voltages higher than the threshold voltages of the transistors Qb and Qa are applied between the bases and the emitters of the transistors Qb and Qa respectively, whereby the transistors Qb and Qa are simultaneously turned on, respectively.

Electrical charge stored in the main circuit capacitor C1 is discharged mainly through the resistor Rc1 and the collector-emitter path of the transistor Qb, and electrical charge stored in the main circuit capacitor C2 is discharged mainly through the transistor Qa and the resistor Rc2. Consequently, even when power supply from the three-phase AC power supply 2 is cut off, for example, the electrical charge stored in each of the main circuit capacitors C1 and C2 can be discharged in a safe manner.

FIG. 4 shows discharge characteristics of the voltage V0 between the main power supply lines N1 and N2 and the terminal voltages Vc1 and Vc2 of the capacitors C1 and C2 before and after output of discharge command. FIGS. 2 and 6 show discharge characteristics in other embodiments respectively and have the same time scale of a horizontal axis and voltage scale of a vertical axis as those of FIG. 4. It can be understood that electrical discharge can occur more quickly in the characteristics of FIG. 4 than in that of FIG. 6.

Figure 5:
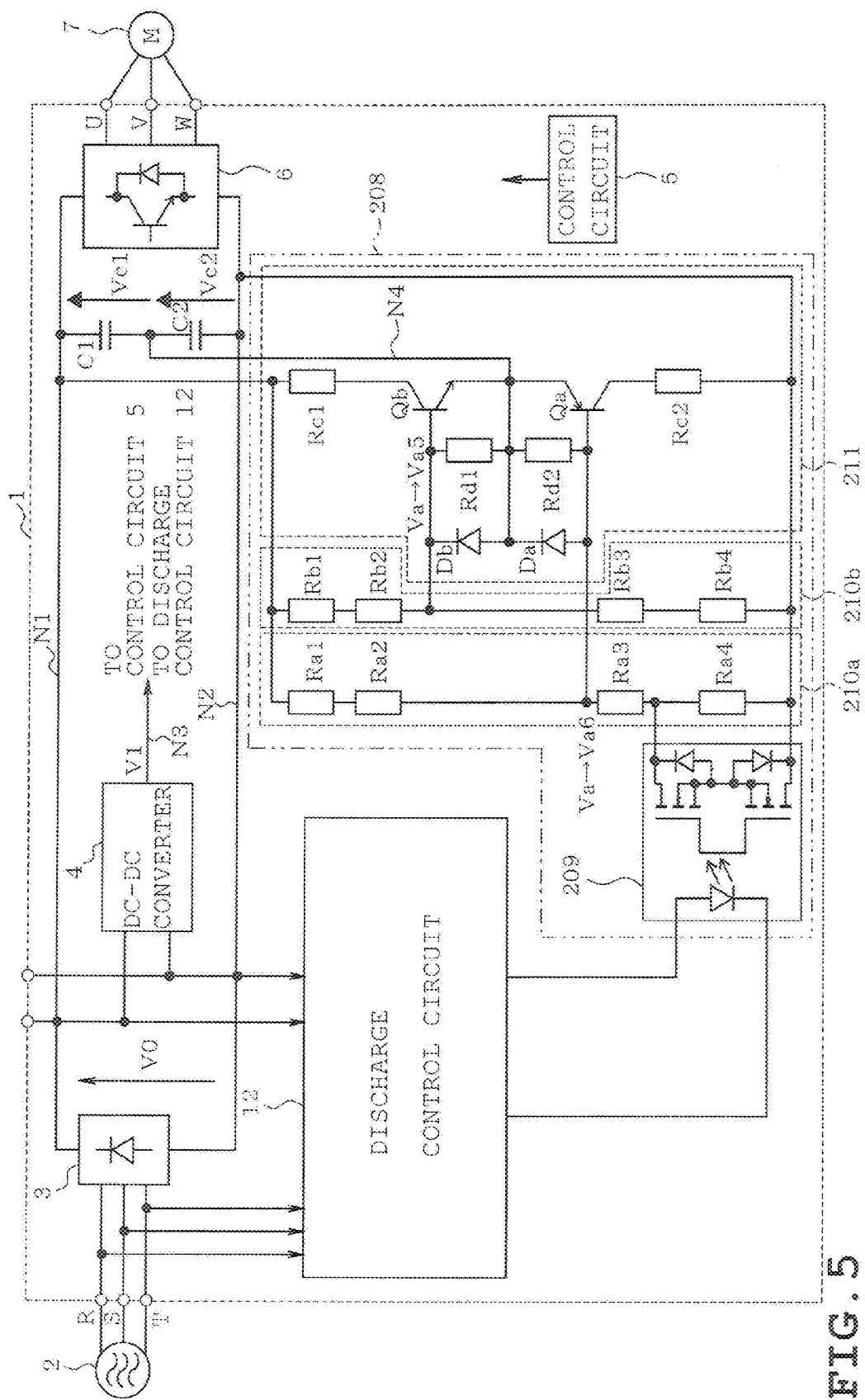
FIG. 5 is a diagram similar to FIGS. 1 and 3, showing an inverter device compared to the inverter devices of the first and second embodiments.

FIG. 5 shows an electrical circuit to be compared with those of FIGS. 1 and 3. FIG. 6 shows discharge characteristics achieved by the circuit configuration shown in FIG. 5. The balancing circuit 208 shown in FIG. 5 includes a photoMOS relay 209 and is configured to change only the resistive potential division balance of one of two series resistors 210a and 210b, that is, the series resistor 210a in power-off.

The configuration of the balancing circuit 208 will now be described. The series resistor 210a includes series-connected resistors Ra1 to Ra4, and the series resistor 210b includes series connected resistors Rb1 to Rb4. The normally-off type photoMOS relay 209 includes a primary side connected to the discharge control circuit 12 and a secondary side connected to both terminals of the resistor Ra4. The voltage stabilization circuit 211 having the same circuit configuration as the circuit 111 is connected to latter parts of two groups of series resistors 210a and 210b connected in parallel to each other.

A divided voltage Va (=V0/2) of the series resistor 210b is supplied to the base of the transistor Qb. Furthermore, since the secondary side of the photoMOS relay 209 is opened in the normal operation, a divided voltage Va (=V0/2) of the series resistor 210a is supplied to the base of the transistor Qa. Accordingly, the voltages of the main circuit capacitors C1 and C2 can be maintained in the balanced state as in the foregoing embodiments.

A discharge command signal (a non-energization signal of photodiode) is supplied to the photoMOS relay 209 from the discharge control circuit 12 in power-off. In this case, the secondary side of the photoMOS relay 209 is energized to be turned on. A short circuit then occurs between terminals of the resistor Ra4. Consequently, the base voltage of the transistor Qa firstly drops with the result that the transistor Qa is turned on. The transistor Qb is maintained in an off-state at this time. However, since the transistor Qa is maintained in the on-state, the charge in the main circuit capacitor C2 is firstly discharged. The voltage at the node N4 then drops, and the transistor Qb is turned on with delay when the base-emitter voltage of the transistor Qb rises to be equal to or above the threshold voltage. Consequently, the charges stored in the respective main circuit capacitors C1 and C2 can be discharged in the safe manner.

It can be understood from the discharge characteristic in FIG. 6 that the interterminal voltage Vc1 of the main circuit capacitor C1 drops with delay relative to the interterminal voltage Vc2 of the main circuit capacitor C2. When the discharge characteristic in FIG. 6 is compared with those in FIGS. 2 and 4, it is confirmed that discharge lags behind those in FIGS. 2 and 4.

Even when the circuit configuration as shown in FIG. 5 is employed, electrical charges stored in the main circuit capacitors C1 and C2 can safely be discharged in the same manners of the above-described circuit configurations (FIGS. 1 and 3). However, it is confirmed that the discharging time can be reduced in each of circuit configurations shown in FIGS. 1 and 3 as compared with the circuit configuration shown in FIG. 5.

According to the circuit configuration as shown in FIG. 3, the voltage dividing ratio of the divided voltage Va at the node N6 by the series resistor 110b is switched to the first voltage dividing ratio (a ratio of (Rb1+Rb2) to (Rb3+Rb4+Rb5)) and simultaneously, the voltage dividing ratio at the node N5 by the series resistor 110a is switched to the second voltage dividing ratio (a ratio of (Ra1+Ra2) to Ra3).

Regarding the voltage switching, the division voltage Va of the series resistor 110b is caused to rise to voltage Va3 and simultaneously, the division voltage Va of the series resistor 110a is caused to drop to the voltage Va4. Consequently, the transistors Qa and Qb can simultaneously be turned on and the discharging times of the main circuit capacitors C1 and C2 can be reduced respectively.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A stored electric power discharging circuit for an inverter device, comprising:
   a group of series resistors configured to be connected in parallel to a plurality of main circuit capacitors in a normal operation;
   a voltage stabilization circuit configured to stabilize interterminal voltages of the respective main circuit capacitors according to a divided voltage of the series resistors during the normal operation; and a control switch having a control input and configured to cut a direct connection between two of the series resistors at a time of power-off, thereby breaking a voltage stability state of the main circuit capacitors by the voltage stabilization circuit.

2. The discharging circuit according to claim 1, wherein:

the main circuit capacitors include a first main circuit capacitor and a second main circuit capacitor;

the series resistors comprise a first resistor and a second resistor;

the control switch is configured to switch to a connected/non-connected state between the first and second resistors according to the control input;

the voltage stabilization circuit includes a first conductive resistor and a first transistor series-connected between terminals of the first main circuit capacitor and a second conductive resistor and a second transistor series-connected between terminals of the second main circuit capacitor;

the first transistor has a control terminal connected between the first resistor and the control switch and the second transistor has a control terminal connected between the control switch and the second resistor; and the control switch is configured to switch to the connected state between the first resistor and the second resistor in a normal operation and the control switch is configured to switch to the non-connected state between the first resistor and the second resistor in power-off.

3. A stored electric power discharging circuit for an inverter device, comprising:

a first series resistor group including a plurality of series resistors configured to be connected in parallel to a plurality of main circuit capacitors;

a second series resistor group including a plurality of series resistors configured to be connected in parallel to a plurality of main circuit capacitors;

a voltage stabilization circuit configured to stabilize inter-terminal voltages of the respective main circuit capacitors according to a divided voltage of the first series resistors and a divided voltage of the second series resistors during the normal operation; and a control switch having a control input and configured to switch a voltage dividing ratio of the first series resistor group to another first voltage dividing ratio and simultaneously to switch a voltage dividing ratio of the second series resistor group to a second voltage dividing ratio differing from the first dividing ratio, thereby breaking a voltage stability state of the main circuit capacitors by the voltage stabilization circuit.

4. The discharge circuit according to claim 3, wherein:

the main circuit capacitors include a first main circuit capacitor and a second main circuit capacitor; the first series resistor is composed by series-connecting a third resistor and a fourth resistor having a resistance value equal to a resistance value of the third resistor;

the second series resistor is composed by series-connecting a fifth resistor, a sixth resistor having a resistance value equal to the resistance value of the fifth resistor and a seventh resistor; and the voltage stabilization circuit includes a first connection resistor and a first transistor series-connected between terminals of the first main circuit capacitor and a second connection resistor and a second transistor series-connected between terminals of the second main circuit capacitor;

the first transistor has a control terminal series-connected between the fifth resistor of the second series resistor and a series circuit of the sixth and seventh resistors and the second transistor has a control terminal connected between the third resistor and the fourth resistor of the first series resistor; and the control switch is configured to cause short-circuit between terminals of the seventh resistor in the normal operation and the control switch is configured to cause an open circuit condition between terminals of the seventh resistor in power-off.

* * * * *